Feb. 23, 1954 C. H. SCOTT 2,670,080

SEDIMENT RAKING MECHANISM FOR LONGITUDINAL SETTLING TANKS

Filed Dec. 29, 1951 9 Sheets-Sheet 1

INVENTOR:
CHARLES HAROLD SCOTT
BY William J Fox
ATTORNEY

Feb. 23, 1954 C. H. SCOTT 2,670,080
SEDIMENT RAKING MECHANISM FOR LONGITUDINAL SETTLING TANKS
Filed Dec. 29, 1951 9 Sheets-Sheet 2
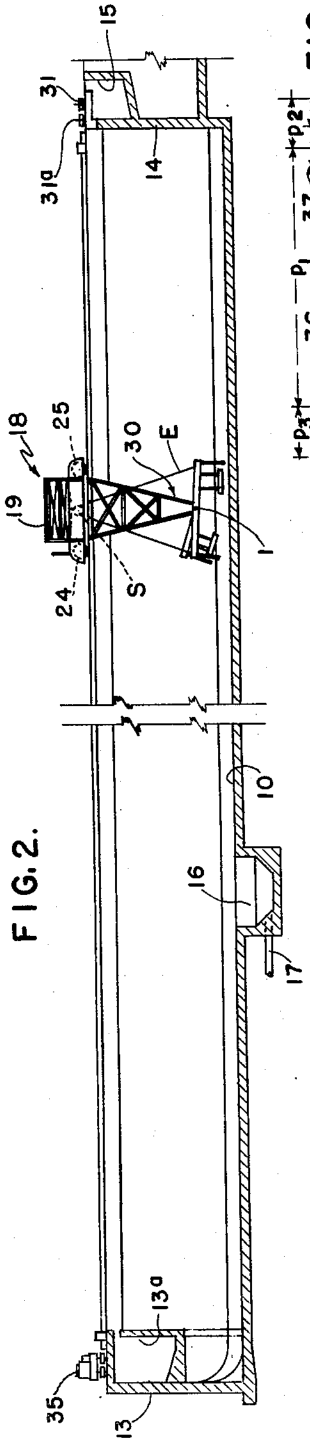
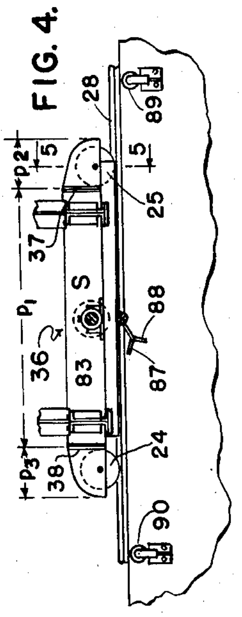
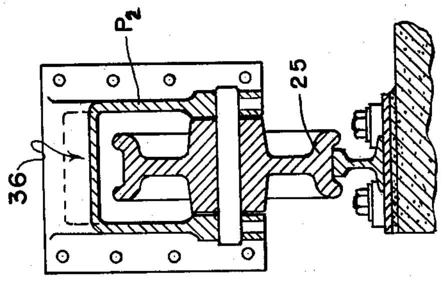
FIG. 5.
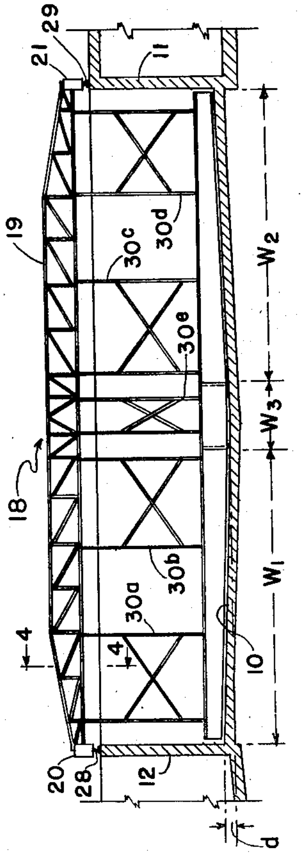
FIG. 3.
INVENTOR:
CHARLES HAROLD SCOTT,
BY William J. Fox
ATTORNEY Feb. 23, 1954 C. H. SCOTT 2,670,080

SEDIMENT RAKING MECHANISM FOR LONGITUDINAL SETTLING TANKS

Filed Dec. 29, 1951 9 Sheets-Sheet 3

INVENTOR:
CHARLES HAROLD SCOTT,
BY William J. Fox
ATTORNEY

Feb. 23, 1954 C. H. SCOTT 2,670,080
SEDIMENT RAKING MECHANISM FOR LONGITUDINAL SETTLING TANKS
Filed Dec. 29, 1951 9 Sheets-Sheet 4
FIG. 8.
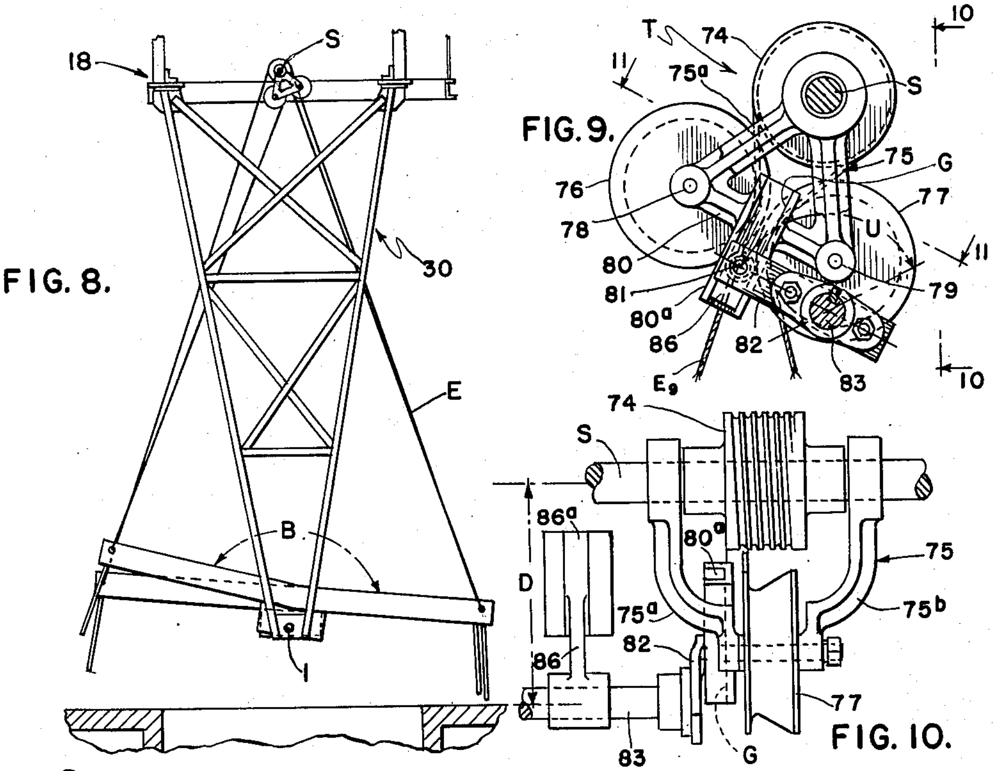
FIG. 8, FIG. 9, FIG. 10
FIG. 12.
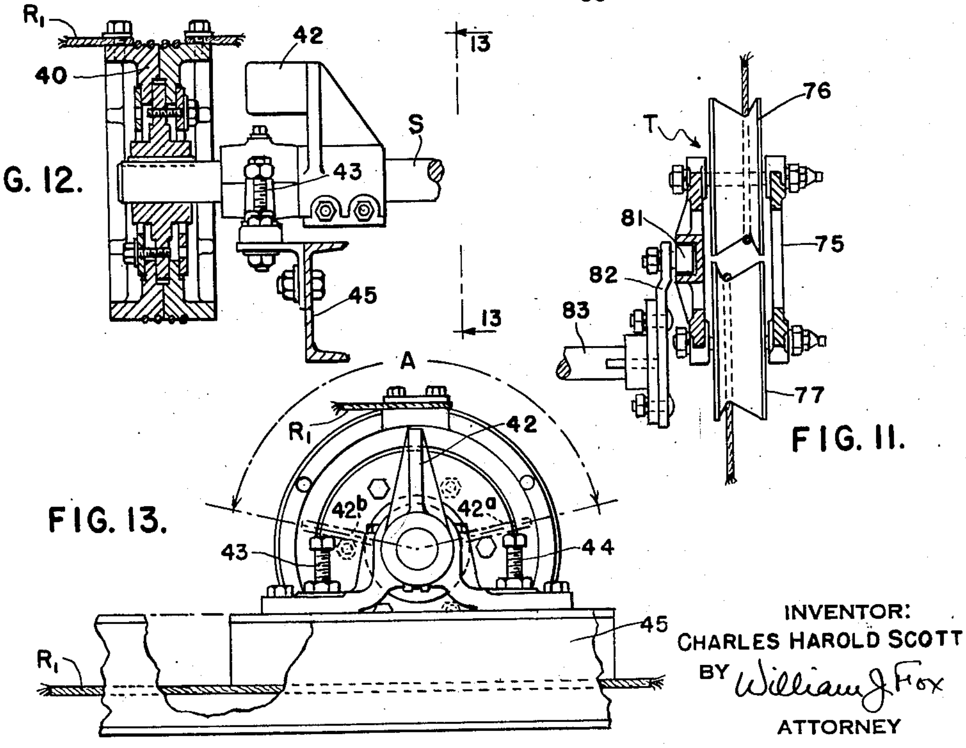
FIG. 11, FIG. 12, FIG. 13
INVENTOR:
CHARLES HAROLD SCOTT
BY William J. Fox
ATTORNEY

SEDIMENT RAKING MECHANISM FOR LONGITUDINAL SETTLING TANKS

Filed Dec. 29, 1951 9 Sheets-Sheet 5

INVENTOR:
CHARLES HAROLD SCOTT,
BY William J. Fox
ATTORNEY

SEDIMENT RAKING MECHANISM FOR LONGITUDINAL SETTLING TANKS

Filed Dec. 29, 1951

9 Sheets-Sheet 6

INVENTOR:
CHARLES HAROLD SCOTT,
BY William J. Fox
ATTORNEY

SEDIMENT RAKING MECHANISM FOR LONGITUDINAL SETTLING TANKS

Filed Dec. 29, 1951 9 Sheets-Sheet 7

INVENTOR:
CHARLES HAROLD SCOTT,
BY William J Fox
ATTORNEY

INVENTOR:
CHARLES HAROLD SCOTT,
BY William J. Fox
ATTORNEY

Feb. 23, 1954 C. H. SCOTT 2,670,080

SEDIMENT RAKING MECHANISM FOR LONGITUDINAL SETTLING TANKS

Filed Dec. 29, 1951 9 Sheets-Sheet 9

INVENTOR:
CHARLES HAROLD SCOTT,
BY William J Fox
ATTORNEY

Patented Feb. 23, 1954 2,670,080

UNITED STATES PATENT OFFICE 2,670,080

SEDIMENT RAKING MECHANISM FOR LONGITUDINAL SETTLING TANKS

Charles H. Scott, Westport, Conn., assignor to The Dorr Company, Stamford, Conn., a corporation of Delaware Application December 29, 1951, Serial No. 264,025

7 Claims. (Cl. 210—55)

This invention relates to sedimentation tanks usable, for example, in the purification treatment of water or sewage, where solids-carrying liquid is continuously fed to the tank while clarified liquid overflows from the tank and a sediment raking mechanism operates to convey settled solids or sludge over a relatively flat tank bottom to discharge.

More in particular, this relates to improvements in sludge raking- and removal mechanism such as employed in the operation of rectangular or longitudinal type of settling tank. In such mechanism there are sludge engaging raking elements or blades which are carried by a frame or structure extending into the tank downwardly from a carriage or wheeled frame transversely spanning the tank and reciprocally removable between the ends of the tank, with reversible rope drive means employed for reciprocating the carriage, and the raking means controllable and effective to convey the sludge over the tank bottom to discharge incident to the reciprocating movement of the carriage.

A problem in the design and operating of such mechanism is encountered where the sludge or sediment is to be conveyed not merely longitudinally to one end of the tank, but is to be conveyed from all points of the tank bottom to a relatively restricted zone or point of discharge herein simply termed the outlet, in which case the sludge must be conveyed by imparting thereto longitudinal as well as lateral component movements having the net result of bringing the sludge convergingly towards and into the outlet from all points of the tank bottom. The use of such restricted outlet zone together with suitable raking mechanism for conveying the sludge convergingly thereto avoids the necessity of employing wide hopper-shaped sumps which require deep excavation, are expensive to construct, and require deep laying of the sludge discharge and disposal pipe, which may be highly undesirable in view of environmental and operational requirements.

Under such conditions there arises the more specific problem of raking efficiency of the mechanism, that is to say, the problem of conveying the sludge or sediment convergingly toward the outlet along the shortest possible paths so that the sum total of sludge travel is a minimum, while by the same token the relative raking capacity of the mechanism becomes a maximum. An object of this invention is to provide an improved reciprocable sediment raking mechanism which is mechanically simple as well as relatively inexpensive to construct, and which has improved raking efficiency.

To attain this object, the invention provides two opposedly effective sets of sludge raking blades mounted upon the reciprocable supporting structure, each set being movable between a lowered sludge-engaging or active position and a raised idle or inactive position; when the carriage moves in the one direction the one set of raking blades is lowered and active while the other set thereby is raised and becomes inactive, and vice versa when the carriage moves in the pposite direction. The raking blades are set at an angle relative to the direction of movement of the carriage somewhat in the manner of ploughing blades whereby the blades are adapted to urge sludge transversely of the tank, that is, in a direction substantially sideways of the longitudinal line of movement of the carriage. Thus the repetitious back-and-forth movement of the carriage urges the sludge which settles on the tank bottom sideways towards and into a longitudinal strip-like collecting zone there to form a ridge-like accumulation the length of which is substantially equal to that of the length of travel of the carriage. For removing the ridge of sludge thus collected the invention provides a pair of movable and specially controllable sludge scooping members, namely a scoop member to travel with each set of raking blades and controllable to be active to move collected sludge only while traveling towards the outlet but to become inactive at the outlet and to remain so as the carriage continues past and away from the outlet even though the then active raking blades continue actively urging sludge sideways in the same direction towards the collecting strip. Upon reaching the end of the tank the carriage movement is reversed, the previously inactive set of raking blades is rendered active together with its associated scoop member, and during the subsequent return movement the blades remain active for the full length of the carriage movement, whereas the associated scoop member remains active only as long as the assembly travels towards and not away from the outlet. Upon reaching the end of the tank this operating cycle of the assembly may repeat itself upon reversal of the carriage movement.

According to one feature, with the sludge outlet disposed intermediate or midway between the ends of the tank and in the strip-like collecting zone, the invention provides a substantially horizontal movable frame tiltable vertically and herein termed the raking frame. This raking frame or main rake carrier is mounted scale-beam-like and is fulcrumed upon the lower free end of the horizontally reciprocable supporting structure. Each end of this main carrier has mounted thereon a set of angularly disposed sludge-raking blades. This main carrier is tiltable so that by tilting it either the one or the opposite set of raking blades thereon can be lowered into active sludge engaging position at the appropriate time, namely at the time of reversal of the carriage movement. When the carriage starts from one end of the tank with the then outer end of the tiltable frame and its raking blades having been lowered into sludge engaging position the then lowered blades will move sludge sideways towards and eventually into the longitudinal zone of sludge collection until the carriage reaches the opposite end of the tank where the direction of carriage movement is reversed and the raking frame is tilted so that thereby in turn the then outer end of the frame with its raking blades is lowered into active sludge engaging position. As the carriage starts returning from that end of the tank, the thus lowered set of blades moves the sludge sideways towards and eventually into the longitudinal zone of sludge collection until the carriage again reaches the opposite end of the tank thereby closing its first cycle of operation which may be repeated. In this way only the appropriate set of raking blades is rendered active at each reversal of the carriage movement. A pair of scoop members mounted each upon one end of a second scale-beam-like member or double-arm lever herein also termed the auxiliary carrier or scoop carrier which has its tilting axis coinciding with that of the fulcrum of the main carrier or raking frame. However, the arms of the auxiliary carrier diverge angularly in a certain manner from those of the main carrier in that they form with each other an obtuse or shallow angle whereas both arms of the main carrier may be coextensive, so that the tilted position of one arm of the auxiliary carrier may coincide with that of the corresponding adjacent arm of the main carrier while the opposite auxiliary arm forms upwardly an acute angle with the corresponding adjacent and associated arm of the main carrier. Control is provided whereby the tilting movements of both the main and auxiliary carriers are automatically so coordinated that one pair of arms (a main arm and an auxiliary arm) coincide as to position or are coextensive as long as they travel towards the sludge outlet with both the respective raking blades and the associated scoop member active upon the sludge; at the sludge outlet the auxiliary carrier alone is tilted so that the until now active scoop member thereon becomes inactive as its supporting arm now forms an acute angle upwardly with the associated main carrier arm which latter continues in its raking position past the sludge outlet; in this way the opposite auxiliary carrier arm is brought to coincide with the then raised and inactive position of its associated main carrier arm so that both these arms although inactive are now positioned and conditioned to go into sludge engaging action simultaneously when they in turn reach the end of the tank and incident to reversal of the carriage movement are tilted downwardly in unison thereby placing their opposite and now inwardly-pointing pair of arms into inactive position and divergent from each other by the aforementioned acute angle. Then the whole assembly supported by the carriage may travel again in the opposite direction, and the control cycle of operation may be reversed upon next reaching the end of the tank.

Further features reside in means and mechanism for effecting control of the raking blades and of the scoop members in coordination to each other and in proper timing with respect to the carriage movement as well as in relation to the location of the sludge discharge or sludge outlet opening in the bottom.

According to one such feature the control means comprise a pulley device. Rope means or wire or a similar linear motion-transmitting means or element is fastened to one end of the tiltable main carrier and run up over a main controlling pulley mounted on the carriage and thence run to the opposite end of the main carrier to be fastened thereon. Oscillatory rotatable motion of the pulley, that is, rotation alternately in the one and in the other direction, will translate itself into a corresponding linear movement of the linear element and thereby into tilting movement of the main carrier or raking frame, such oscillation to be effected for example by each reversal of the pull of the drive rope that moves the carriage.

The tilting of the auxiliary carrier or scoop carrier is similarly effected by a second controlling pulley rotatable together with the first mentioned controlling pulley and engaging a linear element the ends of which are fastened to respective ends of the auxiliary carrier. With both these controlling pulleys being unitary and of identical diameter both carriers can be tilted in unison at the time of reversal of the carriage movement at each end of the tank. But in addition the tilting of one carrier relative to the other, namely the tilting of the scoop carrier relative to the main rake carrier at the sludge outlet is effected by a swivel device comprising a depending bracket swingably movable about the axis of the controlling main pulleys. This bracket is loosely swingable with respect to the main pulley and carries a pair of idler pulleys and is herein termed the idler bracket, the two idler pulleys being disposed in companion fashion so that each engages a respective portion of linear motivating element of the scoop carrier in such a manner that if the bracket is swung relative to the controlling pulleys in the one direction it will shorten one end portion of the linear element while lengthening the opposite end portion, and vice versa.

Hence, the oscillation of the idler bracket can effect tilting movement of the scoop carrier independently of the main carrier. Camming or tripping devices are provided for so independently oscillating the idler bracket and thereby tilting the scoop carrier relative to the main carrier at the sludge outlet, although the scoop carrier and the main carrier are tilted in unison at each end of the tank by the simultaneous rotation of the controlling pulleys.

In summary, this invention provides reciprocable two-way effective main sludge raking means adapted to convey the sludge into a relatively narrow longitudinal collecting zone along the full length of the tank with a restricted sludge outlet disposed within that zone intermediate the ends of the tank, and a pair of scoop members, namely a first and a second scoop member, disposed in opposition to each other and moving with the main raking means and controlled in such coordinated and timed relationship with respect to the main raking means that the first scoop member is effective to engage and convey collected sludge from one end of the tank to the outlet while the second or opposite scoop member is maintained in idle position, that furthermore both scoop members are maintained in idle position while the main raking mechanism continues active past the outlet to the end of the tank, that furthermore the second scoop member is rendered active upon reaching the end of the tank to engage and convey collected sludge for the subsequent return stroke of the main raking means while the first scoop member remains inactive, said second scoop member then being rendered inactive to be maintained inactive together with the other scoop member as the main raking means continue active past the outlet to the end of the tank whence they started this operating cycle of one complete reciprocation.

Figure 2 is a longitudinal section taken on line 2—2 of Figure 1 of the tank.

Figure 3 is a transverse section taken on Figure 1 of the tank, showing a front view of the carriage.

Figure 4 is an enlarged transverse sectional detailed view of the carriage taken on line 4—4 in Figure 3 showing the construction of the box-like side structure of the carriage in some detail.

Figure 5 is a further enlarged cross-section of the box-like track-supported side structure of the carriage taken on line 5—5 in Figure 4, with more details shown.

Figures 6, 7:
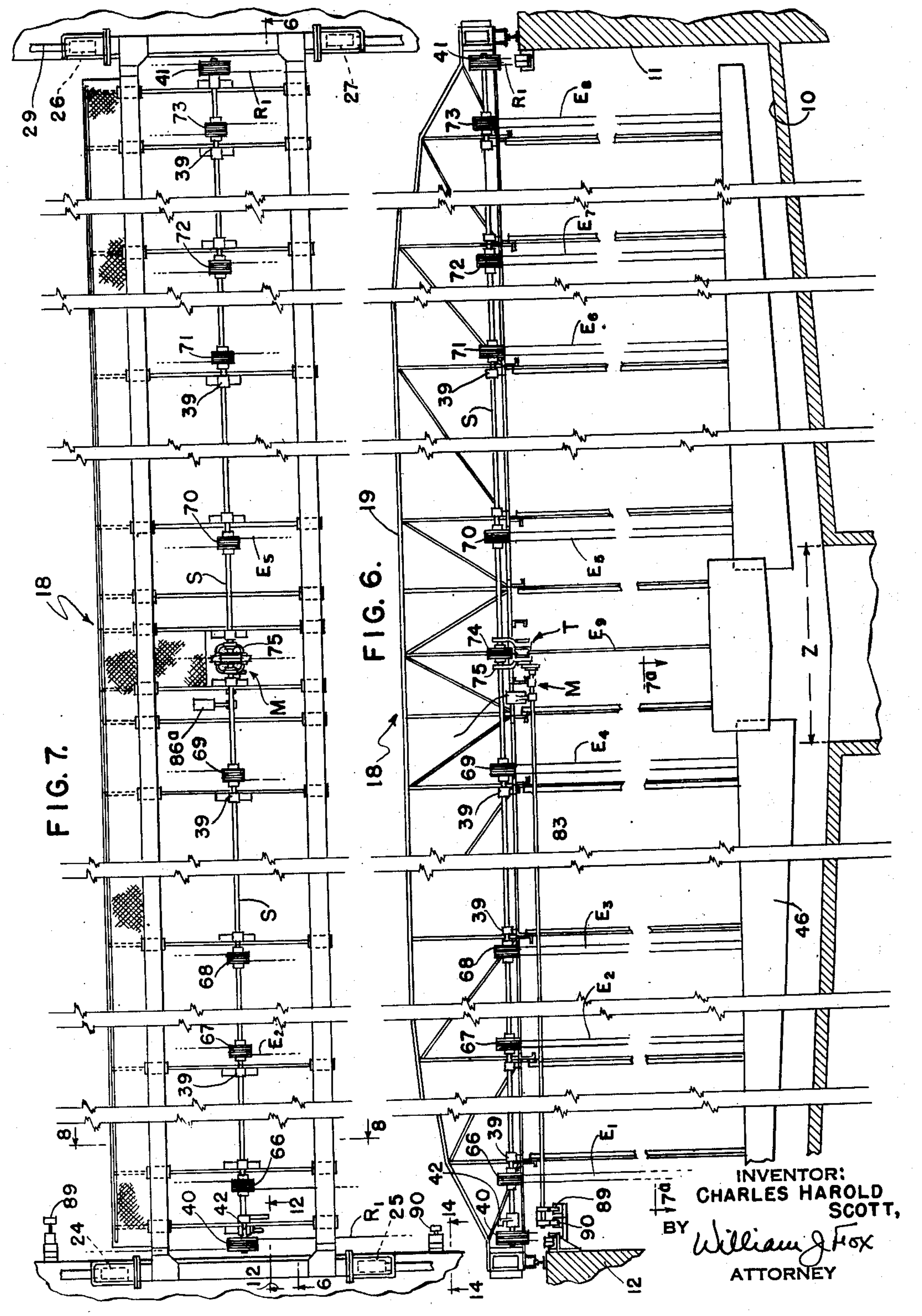
Figure 6 is an enlarged view of the carriage and tank structure shown in the cross-section of Figure 3.
Figure 7 is a top view of the structure shown in Figure 6.

Figure 7ª is a partial cross-section taken on line 7ª—7ª of Figure 6, to show a plan view of the arrangement of the raking bodies as well as of the auxiliary scoop members.

Figure 7ᵇ shows the raking structure of 7ª even though more diagrammatic as well as complete.

Figure 8 is a cross-section through the carriage structure taken on line 8—8 of Figure 7, showing more clearly the mounting of the sludge raking means and of the auxiliary scoop members as upon a depending bracket structure, and also indicating diagrammatically as part of the actuating mechanism the swingable pulley device for individually controlling the movement of the scoop members relative to the sediment outlet.

Figure 9 is an enlarged detail view of the swingable pulley device shown in Figure 8.

Figure 10 is a side view of the swingable pulley device shown in Figure 9 and taken on line 10—10 thereof.

Figure 11 is a section of the swingable pulley device taken on line 11—11 in Figure 10.

Figure 1:
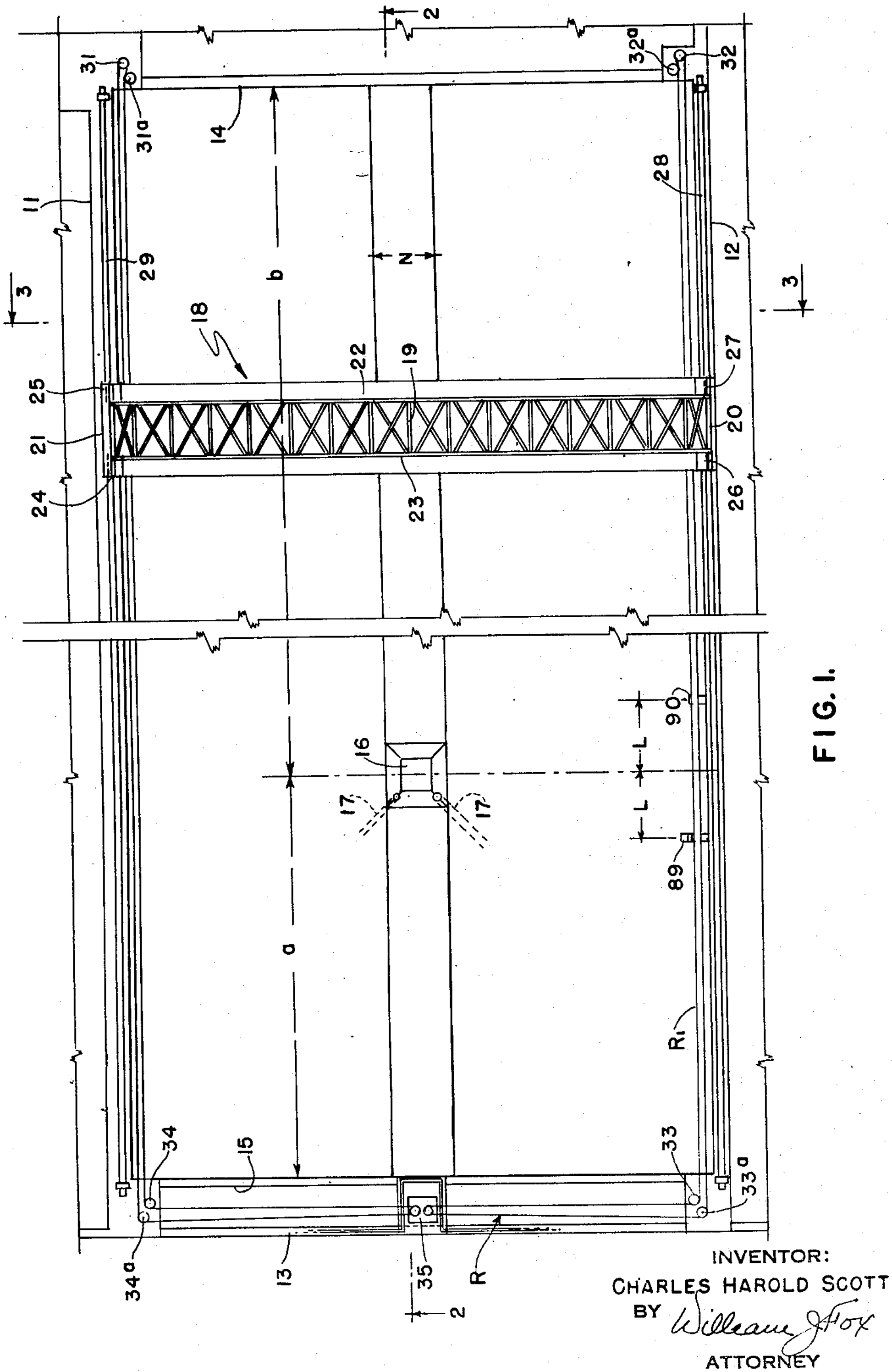
Figure 1 is a diagrammatic top view of the tank showing the tank-spanning carriage structure and peripheral rope drive means therefor, as well as a sediment outlet spaced from both ends as well as from the sides of the tank.

Figure 12 is an enlarged detail view of an outer end portion of the actuating mechanism shown in Figure 7 and taken on line 12—12 thereof and controlled by the rope drive means indicated in Figure 1.

Figure 13 is a side view taken on line 13—13, of the parts shown in Figure 12.

Figures 14, 15:
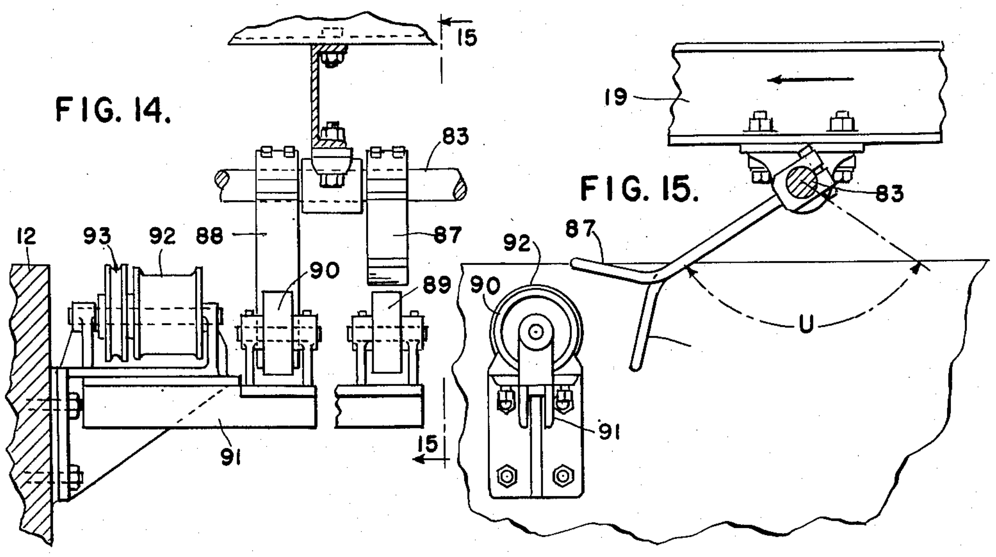

Figure 14 is an enlarged front detail view taken on line 14—14 of Figure 7, of the cam-actuated mechanism as part of the rake actuating mechanism, for individually actuating the scoop members relative to the outlet.

Figure 15 is a side view of the parts of Figure 14 taken on line 15—15 thereof.

Figure 16:
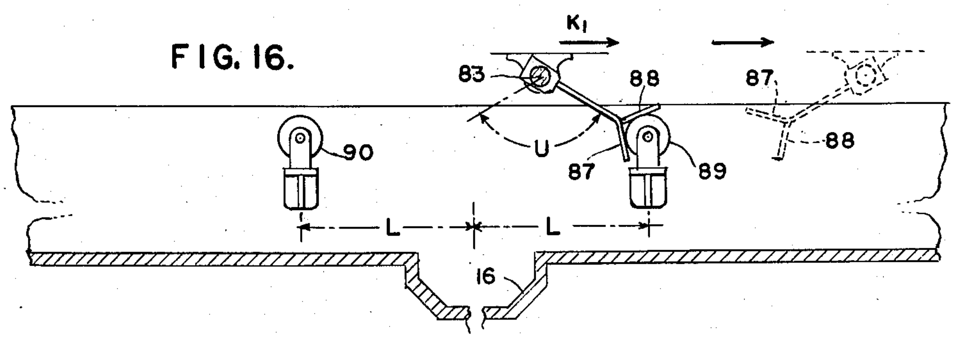
Figure 17:
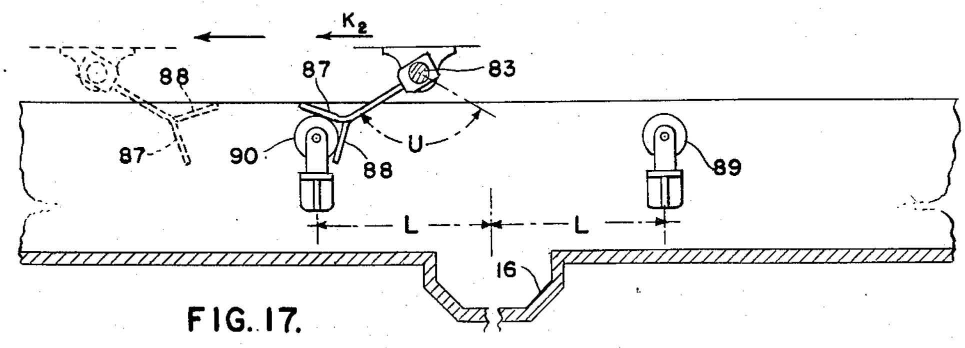

Figures 16 and 17 are diagrammatic operating views illustrative of the functioning of the cam actuated mechanism of Figures 14 and 15.

Figure 18:
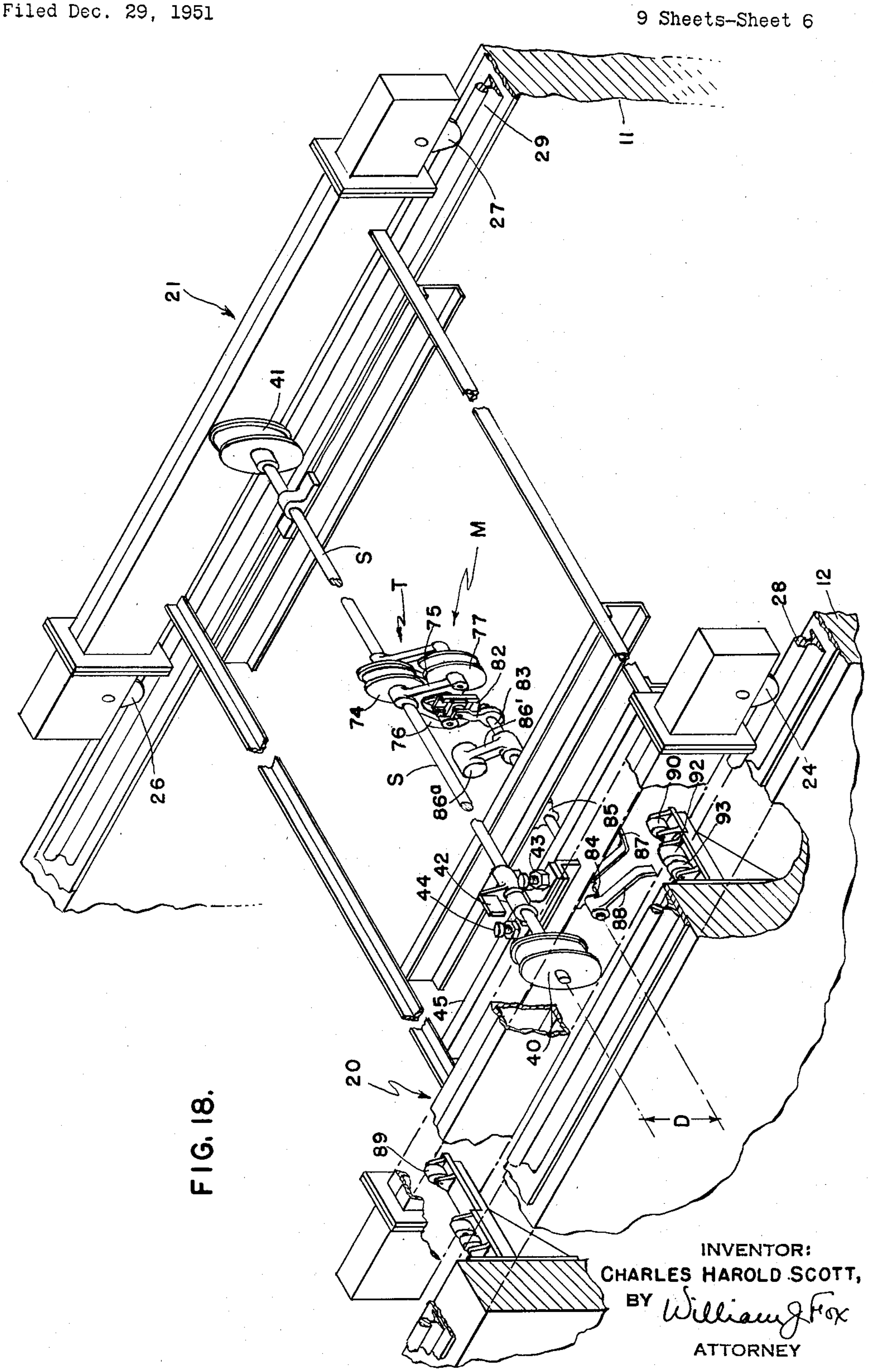

Figure 18 is a perspective view of the carriage showing more clearly the mechanism for actuating the raking means in timed relationship with the auxiliary scoop members, with views obstructing parts broken away and other parts omitted.

Figure 19:
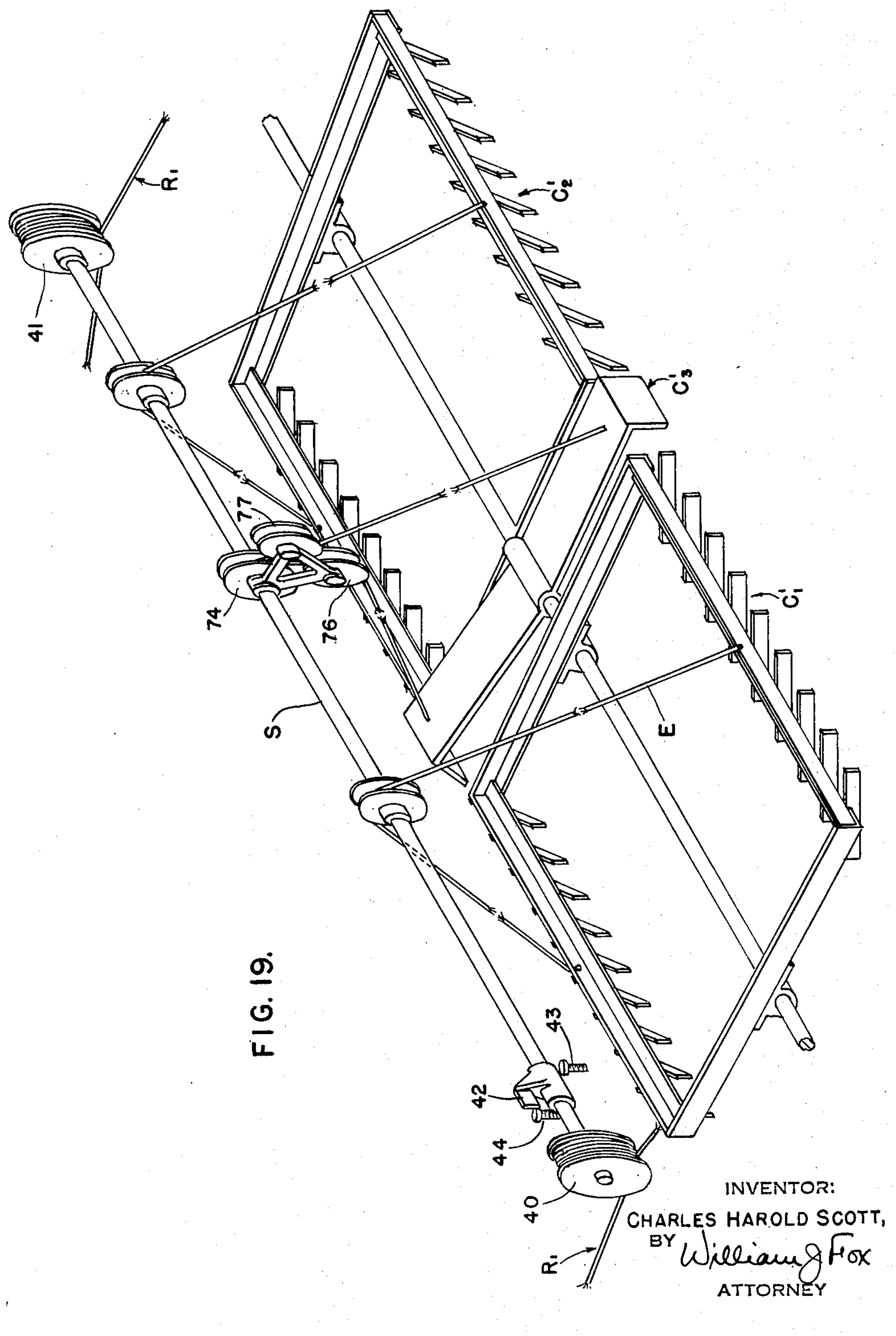

Figure 19 is a more diagrammatic perspective view of the raking means and of the auxiliary scoop members together with the tilting means therefor.

Figure 20:
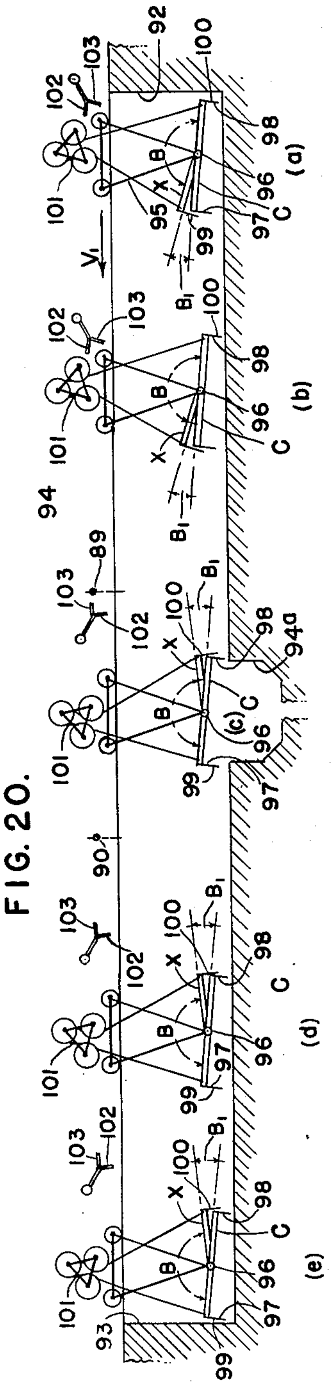
Figure 21:
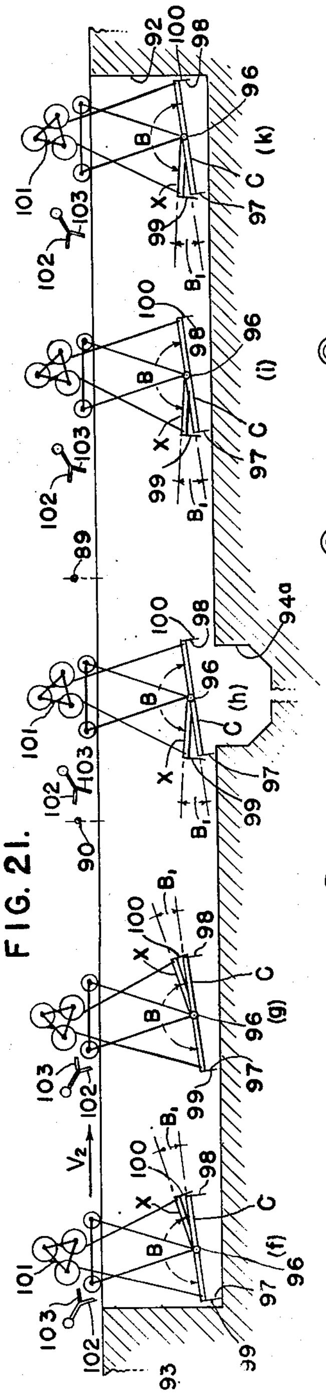

Figures 20 and 21 are diagrammatic operating views of the sludge raking mechanism, with Figure 20 representing the travel of the carriage in one direction towards the influent end, and Figure 21 representing travel of the carriage in the opposite direction towards the effluent end.

Figure 23:
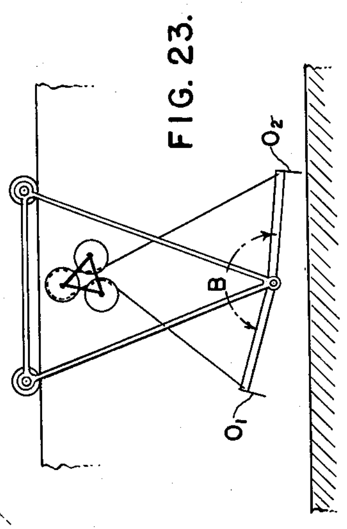
Figure 22:
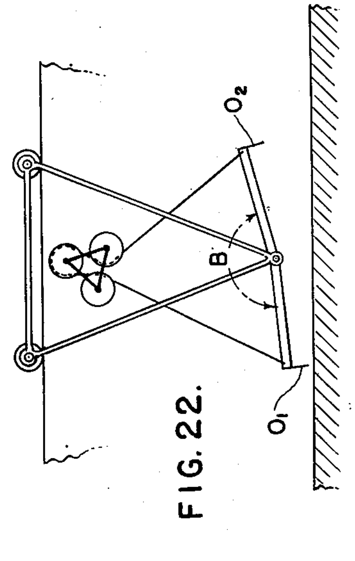

Figures 22 and 23 are enlarged diagrammatic view somewhat similar to those shown in Figures 20 and 21, to indicate the manner of tilting of the auxiliary scoop carrier.

Figure 24:
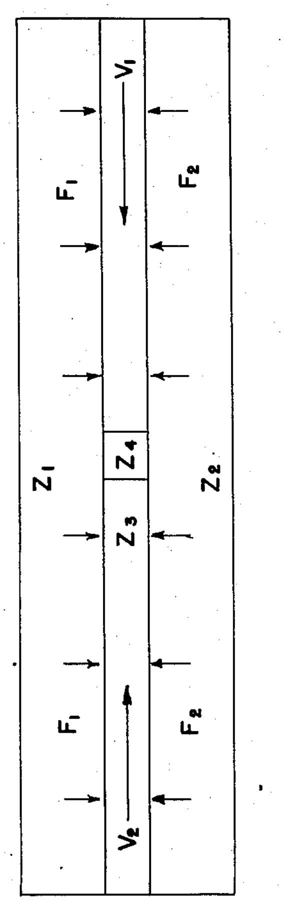

Figure 24 is a diagram indicating the manner of sludge movement upon the tank bottom.

In the overall semi-diagrammatic views of the tank, namely the top view of Figure 1 and the longitudinal sectional view of Figure 2, the tank has a bottom 10, longitudinal side walls 11 and 12, and transverse end walls 13 and 14. End wall 13 represents the influent end of the tank, there being a transverse feed launder 13ª while end wall 14 represents the effluent end of the tank with an effluent launder 15. The tank bottom has a slight inclination from the sides towards the middle (see cross-sectional view of Figure 3) so that the bottom constitutes a very shallow longitudinal depression indicated by depth *d*, with a relatively restricted sludge outlet outlet or sump 16 provided at a low point of this depression and spaced a distance *a* and *b* respectively from both ends of the tank. Sludge discharge pipes leading from the sump are shown at 17.

Sludge raking and removal mechanism as indicated in Figures 1, 2, 3 comprises a rake supporting carriage 18 indicated by a carriage frame 19 having side portions 20, 21 and end portions 22 and 23, and by a pair of wheels 24, 25 at one side and a pair of wheels 26, 27 at the other side, so that the carriage may operate on rails 28 and 29 provided atop the side walls 12 and 11 along the length of the tank. Rake supporting structure 30 comprising sections 30ª, 30ᵇ, 30ᶜ, 30ᵈ, 30ᵉ, extends downward from and in rigid connection with the carriage frame 19, upon the lower end of which structure 30 are pivotally mounted or fulcrumed tiltable scale-beam-like rake carriers or carrier frames indicated as $C_1$, $C_2$ and $C_3$ (see Figure 7ª). A main actuating shaft S is mounted in the carriage frame 19 to motivate flexible linear actuating elements E for tilting the carrier frames $C_1$, $C_2$ and $C_3$ in certain timed relationship with respect to the travel of the carriage to be described and explained in detail further below.

The carriage is motivated to travel back and forth upon the tank from end to end thereof by means of a rope drive mechanism R engaging the side portions of the carriage frame, and indicated in Figures 1 and 2 to include rope elements $R_1$, two pairs of pulleys 31, 31ª and 32, 32ª respectively at the effluent end of the tank and two pairs of pulleys 33, 33ª and 34, 34ª respectively at the inlet end of the tank, as well as by a motorized rope drive unit 35 also at the influent end. This rope drive mechanism in moving the carriage operates as a parallel guide mechanism in the sense that it moves both sides of the carriage at the identical rate and in a manner whereby side-winding or binding of the carriage upon the rails is avoided. A parallel rope drive mechanism for the carriage is well known and disclosed in the patent to Lund No. 2,101,080, the motorized drive unit per se being disclosed in the patent to Scott No. 2,329,559. Suffice it here to say that this rope drive mechanism operates not only to impart reciprocatory motion to the carriage by reversing the drive direction each time the carriage reaches the one or the other end of the tank, but also incidental to such reversal to tilt the sludge raking carriage frames $C_1$, $C_2$ and $C_3$ in a manner to obtain sludge raking effects in accordance with this invention and to be described in detail further below.

In Figure 3 the downwardly extending rake supporting structure 30 (comprising sections $30^a$—$30^e$) provides supporting sections $30^a$ and $30^b$ for a tiltable rake carrier frame $C_1$ indicated by its effective width $w_1$ in Figure $7^a$, and furnishes support by means of sections $30^c$ and $30^d$ for a similar tiltable rake carrier frame $C_2$ indicated by its effective width $w_2$ in Figure $7^a$. The fifth section $30^e$ of the rake supporting structure 30 is centrally disposed between the pair of sections $30^a$, $30^b$ and the pair $30^c$ and $30^d$, and serves to render pivotal support to a third or auxiliary carrier frame or member $C_3$ of relatively narrow effective width $w_3$ in Figure $7^a$.

The Figure 4 section of the carriage frame shows more clearly the construction of the end portions of that frame, namely a hollow cast iron beam member 36 of inverted trough shaped cross-sectional profile, the inverted U-shape of which (see Figure 5) is shown to house a pair of carriage wheels. This trough shape beam as shown comprises a trough shape open-ended body portion $p_1$, and a pair of shell-shaped end portions $p_2$ and $p_3$ having flanged connections 37 and 38 respectively with the body portion $p_1$. Carriage wheels 24 and 25 are shown to be mounted in and housed by the shell-shaped end portions $p_2$ and $p_3$.

More details of construction of the carriage frame and of other parts of the carriage are shown in the somewhat enlarged Figure 6 front view of the carriage, which indicates beyond the similar and diagrammatic view of Figure 3, the mechanism M mounted on the carriage frame for effecting the tilting of the rake carrier frames $C_1$ and $C_2$ timed with respect to the tilting of the intermediate or auxiliary carrier frame $C_3$. Shaft S in effect acts as a rocker shaft extending within the carriage frame 19 from side to side thereof and across the tank (see Figures 6 and 7) with bearings 39 being indicated for rotatably supporting the shaft upon the carriage frame.

A pair of main rope carrying drums 40 and 41 are fixed upon shaft S, with one such drum being disposed at each free end of the shaft. An enlarged detail sectional view of one such drum is shown in Figure 12. Respective portions of the drive rope $R_1$ along each side of the tank engage upon and are wound around respective drums 40 and 41 so that the reversible pull of the drive rope of the parallel rope drive mechanism will rotate the shaft S in the one or in the other direction respectively. The amount of rotation of shaft S in either direction is limited by a stop arm 42 (see Figures 12 and 13) fixed upon shaft S, the swinging motion of this stop arm being limited by a pair of adjustable stops 43 and 44 fixed upon the carriage frame indicated in Figures 12 and 13 as by a structural channel profile 45. In other words, when the rope drive starts pulling the carriage from one of its end positions in the tank, it will preliminary to actually starting the carriage to travel, rotate the shaft S through a fraction of a revolution corresponding to the obtuse angle A in Figure 13 where the corresponding extreme positions of stop arm 42 are indicated in dot-and-dash lines. In this way the carriage will only start moving from each respective end of the tank after the pull of the rope drive will have rotated the shaft S through the angle A in either the one or the other direction, and thereby will have tilted the carrier frames $C_1$, $C_2$ and $C_3$ in unison to an effective position suited for sludge raking in the direction of travel then commencing.

It is appropriate now to describe more fully the construction of the tiltable carrier frames $C_1$, $C_2$, $C_3$ in accordance with the plan view showing thereof in Figures $7^a$ and $7^b$. The carrier frame $C_1$ comprises the horizontal frame structure tiltable about an axis I (see also Figures 2 and 8) and composed of a pair of sludge collecting end blades 46 and 47 arranged in opposition to each other and extending substantially parallel to the axis I, and cross members in the form of structural profiles 48 which interconnect the end blades 46 and 47. Attached to the underside of this tiltable frame structure $C_1$ and disposed within the space defined by the end blades 46 and 47 is an assembly $P_1$ of inclined plow-like sludge raking blades 49 which are fastened to a pair of intermediate members 50 and 51 which in turn are fastened to the underside of the interconnecting members 48 of frame structure $C_1$. A similar set $P_2$ of inclined blades $49^a$ provides in effect an extension of the set $P_1$ of blades 49. $P_3$ and $P_4$ designate two similar sets of inclined blades 52 and $52^a$ respectively although with the blades 52 and $52^a$ disposed in opposition to the blades 49, $49^a$. Blades 49, $49^a$ and 52, $52^a$ are adapted to urge sediment or sludge upon the tank bottom sideways of the direction of travel of the carriage and with the aid of the collecting end blades 46 and 47 eventually into a central longitudinal narrow sludge collecting zone Z such as is represented by a narrow longitudinal lowest portion of the tank bottom and indicated as zone Z in Figure 1 and Figure 6. Similarly, a rake carrier frame $C_2$ comprises a frame structure tiltable about the fulcrum axis I and composed of a pair of sludge collecting end blades 53 and 54 extending substantially parallel to the axis I, and of interconnecting cross members in the form of structural profiles 55. Attached to the underside of this frame structure $C_3$ and disposed within the space defined by the end blades 53 and 54 are two sets $P_5$ and $P_6$ of inclined plow-like sludge impelling blades 56 and $56^a$ respectively, each set of blades being fastened to the frame structure through a pair of intermediate members 57 and 58 for set $P_5$ and intermediate members 59 and 60 for set $P_6$. Disposed in opposition to the sets of blades $P_5$ and $P_6$ are a last pair of sets of similar blades $P_7$ and $P_8$ although acting in opposition to the sets $P_5$ and $P_6$. The set of blades $P_7$ comprises inclined plow-like raking blades 61 fastened to the underside of carrier frame $C_2$ as by means of a pair of intermediate members 62 and 63. The set of blades $P_8$ comprises inclined plow-like raking blades 61$^a$ fastened to the carrier frame $C_2$ as by means of a pair of intermediate members 64 and 65.

The actuating mechanism M for tilting the rake carrier frames $C_1$, $C_2$ and the auxiliary carrier frame $C_3$ will not be described in further detail by reference to Figures 8-19. The mechanism M comprises the aforementioned shaft S turntable between stops 43 and 44 at each point of reversal of carriage travel at respective ends of the tank. The shaft S has fixed thereon drums 66, 67, 68 and 69 which carry windings of respective rope elements $E_1$, $E_2$, $E_3$ and $E_4$ respectively, the ends of which rope elements are fastened to respective ends of the rake carrier frame $C_1$ which frame is thus rendered tiltable or rockable by oscillations of the shaft S. The rake carrier frame $C_2$ is tiltable in unison with carrier frame $C_1$ due to oscillations of shaft S since rope carrying drums 70, 71, 72 and 73 are provided fixed on the shaft and rope elements $E_5$, $E_6$, $E_7$ and $E_8$ are carried upon and actuated by the drums, the rope elements again having their ends connected to respective ends of the carrier frame $C_2$. The intermediate auxiliary carrier frame $C_3$ comprises a pair of auxiliary sludge engaging scoop members $O_1$ and $O_2$ disposed in opposition to each other and constituting the end portions of the frame $C_3$, and a pair of interconnecting members $H_1$ and $H_2$. The auxiliary frame $C_3$ is distinguished from the carrier frames $C_1$ and $C_2$, in that the members $H_1$ and $H_2$ of frame $C_3$ from an obtuse angle B, whereas the cross members 48 and 55 of carrier frames $C_1$ and $C_2$ lie in a single plane.

Another drum 74 is provided fixed upon shaft S at the middle thereof to actuate a rope element $E_9$ having its ends fastened to respective ends of the auxiliary carrier frame $C_3$. While the auxiliary frame $C_3$ is thus tiltable in unison with carrier frames $C_1$ and $C_2$ by the oscillatory rotation of shaft S, the frame $C_3$ is nevertheless also individually tiltable in a certain manner relative to the frames $C_1$ and $C_2$. A mechanism T for thus additionally and independently tilting the auxiliary carrier frame $C_3$ comprises a bracket structure 75 loosely swingable upon shaft S and herein also termed an idler bracket because it carries a pair of idler pulleys 76 and 77 engaged at the inwardly facing peripheral portions by the rope element $E_9$. This idler bracket 75 constitutes a cage partially surrounding the drum 74 in that it comprises two symmetrically disposed halves or bracket sections 75$^a$ and 75$^b$ (see Figures 9 and 10) interconnected by way of axles 78 and 79 carrying the idlers 76 and 77 respectively. While both bracket sections 75$^a$ and 75$^b$ present themselves as basically triangle shapes looked upon in the direction of shaft S, it is to be noted that the base portion 80 of bracket section 75$^a$ is formed with a grooved portion 80$^a$ extending at right angles to the base portion 80, the groove itself in portion 80$^a$ being indicated as G. This groove G serves as a guide for a cam roller 81 lodging in the groove and in turn mounted upon the end of an actuating arm 82 which is fixed upon the inner end of an auxiliary actuating shaft 83 (see Figures 9, 10, 18) mounted upon the carriage frame 19 and spaced a distance D vertically downwardly from shaft S. Bearings for shaft 83 are indicated at 84 and 85 (see Figure 18). The groove G has in it at its lower end a stop 86 which limits the angular throw of the actuating arm 82 in both directions, the extent of the throw being indicated by angle U in Figure 9. The auxiliary actuating shaft 83 furthermore has fixed upon it a weighted arm 86′ substantially coextensive with actuating arm 82 and comprising a weighted end portion 86$^a$ which by its overthrow action is effective to hold the swingable bracket in either one or the other of its extreme angular positions. The significance and effect of so actuating the swingable idler bracket 75 is well illustrated in the diagrammatic Figures 22 and 23 inasmuch as swinging the bracket to the Figure 22 position means lowering the auxiliary scoop member $O_1$ while raising the auxiliary scoop member $O_2$; whereas swinging the bracket 75 to the Figure 23 position means lowering the auxiliary scoop member $O_2$ while raising the auxiliary scoop member $O_1$.

According to this invention, in order to establish the Figure 22 and the Figure 23 tilted position respectively by way of swinging the bracket structure 82 at predetermined points of carriage travel and in predetermined relationship to the tilting of the carrier frames $C_1$ and $C_2$, there are furthermore provided a pair of cam fingers 87 and 88 (see Figures 14, 15, 16, 17, 18) fixed upon the outer end of the auxiliary shaft 83 and adjacent to side wall 12 of the tank. These cam fingers 87 and 88 extend from shaft 83 more or less downwardly, namely in a direction opposite to that of actuating arm 82 and of weighted arm 86′, and as the carriage travels back and forth upon its tracks along the tank these cam fingers 87 and 88 engage stationary cam rollers 89 and 90 mounted upon the inner face of side wall 12 at the upper portion thereof (see Figures 4, 14, 15, 16, 17, 18). These cam rollers 89 and 90 are spaced each a distance L as measured along the length of the tank from the center of the sump or sludge outlet 16 in opposite directions therefrom, the distances L being so dimensioned as to bring about rotation of auxiliary shaft 83 from the Figure 16 position to the Figure 17 position and thus to effect swinging of idler bracket 75 from the Figure 22 position to the Figure 23 position, or else to bring about rotation of auxiliary shaft 83 from Figure 17 position to Figure 16 position and thus to effect swinging movement of bracket 75 from the Figure 23 position to the Figure 22 position, all this because of cam roller 89 urging cam fingers 87 from Figure 16 to Figure 17 position as the carriage travels in the direction of arrow $K_1$, see Figure 16, and because of cam roller 90 urging cam finger 22 from Figure 17 to Figure 16 position as the carriage travels in the direction of arrow $K_2$.

Each stationary cam roller 89 and 90 is mounted upon a bracket structure fastened to and extended inwardly from the inner face of side wall 12 of the tank. As exemplified in Figure 14 the bracket structure 91 carrying the cam roller 90 for cam finger 88 is shown also to carry idler pulleys 92 and 93 to act as rope supporting and guiding elements for the carriage rope drive mechanism. It will be understood that the cam rollers 89 and 90 are so disposed relative to the sludge sump 16 as to tilt the carrier frame $C_3$ at a point of carriage travel where the then sludge engaging auxiliary scoop members $O_1$ and $O_2$ respectively are raised upon reaching the sump even though without having the then inactive scoop member engaged upon the sludge. Hence both scoop members $O_1$ and $O_2$ will continue past the sump inactive, even as carrier frames $C_1$ and $C_2$ continue in their then active position past the sump.

*Operation*

With the foregoing description of structure in mind the operating cycle itself of the sludge raking and removal mechanism may be described and explained by way of the diagrammatic Figures 20 and 21. Figures 20 and 21 in fact represent the operating cycle of the mechanism inasmuch as Figure 20 shows the function of the mechanism as the carriage travels from the effluent end 92 to the influent end 93 of a tank 94, and Figure 21 shows the function of the mechanism as the carriage returns from the influent end to the effluent end of the tank. The Figure 20 travel of the carriage is represented by a sequence of conditions or operating phases (*a*), (*b*), (*c*), (*d*), (*e*) of the raking means, while the Figure 21 return travel of the carriage is represented by a sequence of conditions or operating phases (*f*), (*g*), (*h*), (*i*), (*k*) of the raking means. The carriage is here diagrammatically indicated as a wheeled triangular structure 95 with the apex of the triangle pointing downwardly and furnishing the fulcrum 96 for the rake carrier frames collectively indicated at C (representing the carrier frames $C_1$ and $C_2$ previously described) and the auxiliary carrier frame X (corresponding to the auxiliary carrier frame $C_3$ previously described). In keeping with corresponding previously described structure the carrier frames C extend substantially in a single plane and have sets of raking blades indicated at 97 (corresponding to sets $P_1$, $P_2$, $P_5$, $P_6$ of Figures 7[a] and 7[b]) and at 98 (corresponding to sets $P_3$, $P_4$, $P_7$, $P_8$ of Figures 7[a] and 7[b]). Furthermore, in keeping with previously described structure the auxiliary carrier frame X constitutes the obtuse angle B whereby it forms with the carrier frames C the differential or complementary acute angle $B_1$ which at various times of the operating cycle will appear either to the left or to the right of the fulcrum 96. The auxiliary scoop members on frame X are indicated at 99 and 100 (corresponding to the above described scoop members $O_1$ and $O_2$).

From what has been said in the description of Figures 1–19 it will be understood that the reversal of the pull of the drive rope mechanism is effective to tilt both the carrier frames C simultaneously with the auxiliary carrier frame X namely as between the phase (*a*) position of Figure 20 and the phase (*k*) position of Figure 21. Assuming the carriage in Figure 20 to start in the direction of arrow $V_1$ with the raking means in the phase (*a*) condition, that is with raking elements 98 and scoop member 100 coinciding in lowered active sludge engaging position, and raking elements 97 raised in inactive position by forming between carrier frames C and X the acute angle $B_1$ to the left of fulcrum 96. Because of the pull of the drive rope $R_1$ upon the carriage in the direction of arrow $V_1$, the carriage proceeds towards the sludge sump 94[a] with the raking means still in the same condition as is indicated by the phase (*b*) of carriage travel. In particular the then condition of the auxiliary carrier X acts with its scoop members 99 and 100 positioned in accordance with the position of the actuating mechanism which comprises the idler bracket diagrammatically shown at 101 (corresponding to the idler bracket 75 in Figures 9 and 10), and cam fingers diagrammatically indicated at 102 and 103 (corresponding to cam fingers 87 and 88 in Figures 14, 15, 16). However, as the carriage reaches the vicinity of the sludge sump 94[a] the cam roller 90 (see Figure 17) will engage cam finger 88 and tilt the auxiliary carrier frame X relative to the carrier frames C by swinging the idler bracket 101 from its phase (*b*) position to the phase (*c*) position so that now the carrier frame X forms the acute angle $B_1$ to the right of fulcrum point 96, thereby raising scoop member 100 to inactive position while lowering the opposite scoop member 99 to a point of alignment with the raised and inactive raking blades 97 of carrier frames C.

Thus with only the raking blades 98 of carrier frames C active the carriage continues towards the inlet end 93 of the tank as is indicated by the condition of the intermediate phases (*d*) and by the condition of the end phase (*e*) of carriage travel, the phases (*d*) and (*e*) being identical to each other as well as to phase (*c*).

Thereupon the rope drive unit 35 (see Figure 1) will automatically function to reverse itself so as to start the carriage on its return travel the sequential phases of which are shown in Figure 21. That is to say, as the pull of the drive rope $R_1$ is being reversed it rotates the shaft S by way of drums 40 and 41 through the arc A (see Figure 13) namely from the position 42[a] to position 42[b] of stop arm 42, thus tilting the carrier frames C in unison with the auxiliary carrier frame X from the phase (*e*) condition of Figure 20 to the phase (*f*) condition of Figure 21. The rope drive mechanism then starts and continues to pull the carriage in the direction of arrow $V_2$ with all the carrier frames C and X continuing in the phase (*f*) condition as is indicated by the intermediate phase (*g*) being identical to phase (*f*). Only when the carriage reaches the vicinity of the sump 94[a] and the cam finger 87 (see also Figure 16) engages cam roller 89, is auxiliary carrier X tilted (in the manner and by the means already described for Figure 20) to inactive position relative to the carrier frames C, so that there appears to the left of fulcrum 96 the differential acute angle $B_1$ between carrier frames C and auxiliary carrier frame X. This means that from here on the then active raking means 97 of carrier frames C continue active on the sludge but with the associated scoop member 97 raised to inactive position, while the opposite then inactive raking means 98 of carrier frames C continue raised and inactive although in alignment with the also inactive scoop member 100, all as indicated by the intermediate phase (*i*) and by the final phase (*k*) of the carriage movement, the phases (*i*) and (*k*) being identical to phase (*h*) as to the condition of the frames C and X.

Figure 7A:
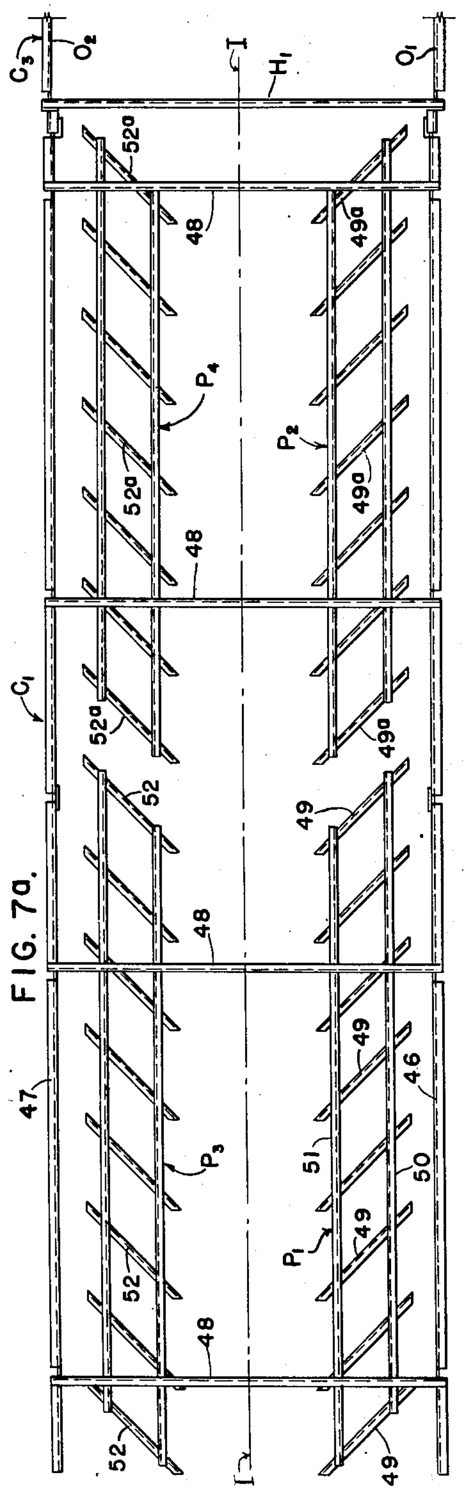

The effect of the operating cycle illustrated in Figures 21 and 22 in terms of sludge movement upon the tank bottom will be seen most clearly by considering the Figures 20 and 21 operating cycle in conjunction with the sludge movements induced upon the tank bottom and indicated in the diagram of Figure 24. For that purpose and according to that diagram the tank bottom may be said to represent a pair of lateral longitudinal sludge movement zones $Z_1$ and $Z_2$, and a longitudinal central zone $Z_3$. Every time the carriage travels in the direction $V_1$ of Figure 20 sludge is urged from both sides of the tank a a step across zones $Z_1$ and $Z_2$ towards and eventually into the collection zone $Z_3$ as indicated by transverse arrows $F_1$ and $F_2$. It might here also be added that the effect of the inclined plow-like raking blades of carrier frames C is aided by the collecting effect of the straight end blades (see Figure 7a) 46 and 47 of carrier frame $C_1$ and straight end blades 53 and 54 of carrier frame $C_3$. In addition these end blades reach into the end corners of the tank bottom and are thus effective to remove therefrom any quantities of sludge that might not be reached by the plow-like blades 49, 52, 49a, 52a and 56, 61, 56a, 61a of carrier frames $C_1$ and $C_2$ respectively.

Figure 7B:
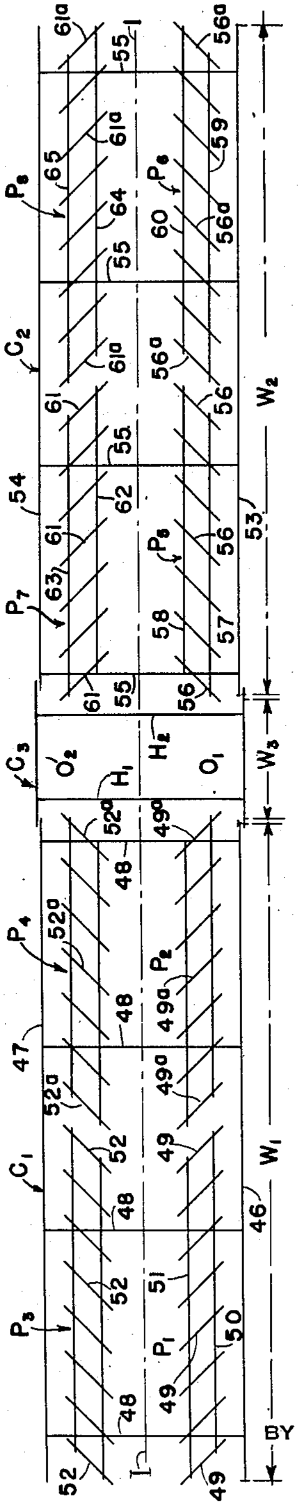

A similar effect of stepwise transverse sludge movement is realized every time the carriage travels in the direction $V_2$ of Figure 21. Thus, as a result of the reciprocation of the carriage the sludge from zones $Z_1$ and $Z_2$ is collected in and along the zone $Z_3$ in the form of a ridge-like accumulation where in turn it is advanced alternatingly from either end of that zone by the above-described auxiliary scoop members 99 and 100 of Figures 20 and 21 or $O_1$ and $O_2$ of Figures 7a and 7b towards and into the sludge sump $Z_4$.

I claim:

1. A longitudinal settling tank having a carriage spanning the tank and reciprocable between the ends thereof with sediment raking means supported from the carriage and operable by raising and lowering for effecting one-way conveyance of sediment upon the tank bottom towards a bottom outlet incident to the travel of the carriage; characterized by raking means comprising a first set of raking blades adapted to be raised and lowered for effecting conveyance of sediment when the carriage travels in the one direction, a second set of raking blades disposed in opposition to the first set and adapted to be raised and lowered for effecting conveyance of sediment when the carriage travels in the opposite direction, movable main carrier means supported from said carriage and operable for raising and lowering the two sets of blades in alternation, main actuating means cooperatively associated with said main carrier means for raising and lowering said sets of blades in alternation whereby sediment is conveyed by both sets of blades into a longitudinal collecting zone extending the length of carriage travel as between the ends of the tank with the sediment outlet disposed substantially within said longitudinal collecting zone, a pair of scoop members each of which is cooperatively associated with a respective set of blades, movable auxiliary carrier means supported from said carriage and operable for raising and lowering said scoop members in alternation, auxiliary actuating means for raising and lowering the scoop member in relation to the carriage travel whereby each respective scoop member is rendered active to advance sediment in and along said collecting zone with said set of blades moving towards the outlet and whereby the scoop is rendered inactive at said outlet to continue inactive while the set of blades is moving past and away from the outlet.

2. The settling tank according to claim 1, in which the main carrier means comprise a tiltable frame each end of which carries a respective set of blades, in which the main actuating means comprise a main pulley, main linear flexible motion transmitting means engaged by the pulley with each end of said linear means being attached to a respective end portion of said tiltable frame so that the frame is tiltable by turning the pulley in the one and then in the other direction for alternately raising and lowering the respective sets of blades, automatic means for turning the pulley whenever the direction of travel of the carriage is reversed at either end of the tank to lower the then outer set of blades; in which the auxiliary carrier means comprise a tiltable auxiliary carrier member each end of which carries a respective scoop member; in which the auxiliary actuating means comprise an auxiliary pulley rotatable with said main pulley, auxiliary linear flexible motion transmitting means engaged by said auxiliary pulley with each end of said auxiliary motion transmitting means attached to a respective end of said auxiliary carrier so that the carrier is tiltable by turning the auxiliary pulley in the one and then in the other direction, a depending idler bracket swingable in coaxial relation with said auxiliary pulley, a pair of idler pulleys mounted side by side upon the depending portion of said bracket and disposed below and substantially in a plane with said auxiliary pulley with the two end portions of said auxiliary linear means each running over a respective idler pulley and between the pulleys, said bracket when swung in the one direction being effective to relatively shorten one end of the auxiliary linear means while lengthening the other end and vice versa when the bracket is swung in the opposite direction, and automatic means for swinging said bracket whenever the carriage reaches the sediment outlet in a manner whereby the then active scoop member is rendered inactive while the opposite scoop member is lowered correspondingly and substantially only to a position of alignment with the then inactive set of raking blades, said inactive set of raking blades and scoop member being adapted to be lowered in unison into sediment engaging position when the carriage reaches the end of the tank and when its direction of travel is reversed.

3. A longitudinal settling tank with side and end walls, having a carriage spanning the tank and reciprocable between the ends thereof with sediment raking means supported from the carriage and operable by raising and lowering for effecting one-way conveyance of sediment upon the tank bottom towards a bottom outlet incident to the travel of the carriage; characterized by raking means comprising a main tiltable frame each end of which carries a set of raking blades with the two sets disposed in opposition to each other; main actuating means for the tiltable frame comprising a main rotary actuator member mounted on the carriage, main motion transmitting means engaged by the actuator member and attached to said tiltable frame so that the frame is tiltable by turning the main actuator member in the one and then in the other direction for alternately raising and lowering the respective sets of blades whereby sediment is conveyed by both sets of blades into a longitudinal collecting zone extending the length of carriage travel as between the ends of the tank with the sediment outlet disposed substantially within said longitudinal collecting zone, automatic means for turning the main actuator member whenever the direction of travel of the carriage is reversed at either end of the tank to lower the then outer set of blades; a pair of scoop members each of which is cooperatively associated with a respective set of raking blades, an auxiliary tiltable carrier member each end of which carries a respective scoop member, auxiliary actuating means for tilting the auxiliary carrier member in such timed relationship with respect to the movement of the carriage and with respect to the tilting of said main tiltable frame, that each respective scoop member is rendered active to advance sediment in and along said collecting zone with said set of blades moving towards the outlet and whereby the scoop member is rendered inactive at said outlet to continue inactive while the set of blades is moving past and away from the outlet, said auxiliary actuating means comprising an auxiliary actuator member rotatable coaxially and together with said main actuator member, auxiliary linear flexible motion transmitting means engaged by said auxiliary actuator member with each end of said auxiliary motion transmitting means attached to a respective end portion of said auxiliary carrier member so that the member is tiltable by turning the auxiliary actuator member in the one and then in the other direction, a depending idler bracket member swingable in coaxial relation with said auxiliary actuator member, a pair of idler pulleys mounted side by side upon the depending portion of said bracket member and disposed below and substantially in a plane with said auxiliary actuator member with the two end portions of said auxiliary linear means each running from said auxiliary actuator member to and over a respective idler pulley as well as running between the pulleys, said bracket member when swung in the one direction being effective to relatively shorten one end of the auxiliary linear means while lengthening the other end and vice versa when the bracket member is swung in the opposite direction, a horizontal oscillatable shaft mounted upon the carriage and extending in a direction transversely of the tank namely from adjacent the tank wall to adjacent said swingable bracket member, engaging means for operatively connecting one end of the shaft with said swingable bracket member whereby the oscillation of the shaft is adapted to produce a concurrent oscillation of the bracket member with detent means provided for maintaining the bracket member in the one or in the other of its extreme oscillating positions, and carriage-actuated means so disposed and effective between the other end of said shaft and one end wall of the tank that said auxiliary carrier member is tilted in accordance with the above mentioned timed relationship between the carriage movement and the tilting of the main tiltable frame.

4. The settling tank according to claim 3, in which the engaging means between said horizontal shaft and said swingable bracket member comprise a radially extending grooved portion on said bracket member, and an arm extending upwardly fixedly from said shaft and into sliding engagement with said grooved portion.

5. The settling tank according to claim 3, in which the detent means for the bracket member comprise an arm fixed upon said shaft and provided with weighted means at the free end thereof, said weighted arm being adapted to move from one extreme overthrow portion to the opposite extreme position incident to the oscillation of said shaft.

6. The settling tank according to claim 3, in which said auxiliary actuator member is in a form of a spirally grooved drum member engaged by a corresponding spirally wound portion of said auxiliary linear motion transmitting means.

7. The settling tank according to claim 3 and in which the carriage actuated means comprise cam arm means provided upon said horizontal shaft to travel with the carriage, and stationary cam roller means provided upon said side wall of the tank and engageable by said cam arm means.

CHARLES H. SCOTT.

References Cited in the file of this patent

UNITED STATES PATENTS

| Number | Name | Date |
|---|---|---|
| 2,099,654 | Lund | Nov. 16, 1937 |
| 2,101,079 | Lund | Dec. 7, 1937 |
| 2,101,080 | Lund | Dec. 7, 1937 |
| 2,168,264 | Marshall | Aug. 1, 1939 |
| 2,305,929 | Lund et al. | Dec. 22, 1942 |